US010434473B2

(12) United States Patent
Tanizaki et al.

(10) Patent No.: US 10,434,473 B2
(45) Date of Patent: Oct. 8, 2019

(54) FILTRATION DEVICE

(71) Applicant: Mitsubishi Chemical Corporation, Tokyo (JP)

(72) Inventors: Yoshie Tanizaki, Aichi (JP); Hiroyuki Okazaki, Aichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 324 days.

(21) Appl. No.: 14/378,327

(22) PCT Filed: Feb. 21, 2013

(86) PCT No.: PCT/JP2013/054317
§ 371 (c)(1),
(2) Date: Aug. 13, 2014

(87) PCT Pub. No.: WO2013/129227
PCT Pub. Date: Sep. 6, 2013

(65) Prior Publication Data
US 2015/0021254 A1    Jan. 22, 2015

(30) Foreign Application Priority Data
Feb. 29, 2012    (JP) .................. 2012-044394

(51) Int. Cl.
*B01D 63/02*    (2006.01)
*C02F 1/44*    (2006.01)
*C02F 103/02*    (2006.01)

(52) U.S. Cl.
CPC .............. *B01D 63/024* (2013.01); *C02F 1/44* (2013.01); *B01D 2313/04* (2013.01);
(Continued)

(58) Field of Classification Search
None
See application file for complete search history.

(56) References Cited

U.S. PATENT DOCUMENTS 4,636,307 A * 1/1987 Inoue ................. B01D 19/0031
                                                      210/188
5,160,038 A * 11/1992 Harada ................. B01D 61/08
                                                      210/149

(Continued)

FOREIGN PATENT DOCUMENTS

JP    S62-244409    10/1987
JP    H06-055039    3/1994
(Continued)

OTHER PUBLICATIONS

"International Search Report (Form PCT/ISA/210) of PCT application", dated Apr. 23, 2013, with English translation thereof, p. 1-p. 4 in which the listed references (JPH06-055039, JP2011-072900, JP2003-126846, JPH11-253936 and JPS62-244409) were cited.

*Primary Examiner* — Benjamin M Kurtz
(74) *Attorney, Agent, or Firm* — JCIPRNET

(57) ABSTRACT

Provided is a filtration device exhibiting a high water treatment capacity and capable of increasing the longevity of a hollow-fiber filter, in a water purification device not requiring a purification material and requiring a high water treatment capacity. The filtration device (3) has: a housing case (15) having a water inlet unit and a water outlet unit arranged on one end side thereof; and a membrane module (17) provided inside this housing case (15). A first flow path (31) for causing raw water that has flowed in from the water inlet unit (21) to flow further to the other end side of the housing case (15) than the membrane module (17), and a second flow path (33) for causing the raw water that has flowed further to the other end side of the housing case (15) along this first flow path (31) to pass through the membrane module (17) and flow to the water outlet unit (23) are
(Continued)

provided inside the housing case (15). A spacer (19) is provided on the upstream side of the membrane module (17) in the second flow path (33).

5 Claims, 6 Drawing Sheets

(52) U.S. Cl.
CPC .... *B01D 2313/08* (2013.01); *B01D 2313/143* (2013.01); *B01D 2313/146* (2013.01); *B01D 2313/21* (2013.01); *B01D 2319/04* (2013.01); *B01D 2319/06* (2013.01); *B01D 2325/36* (2013.01); *B01D 2325/38* (2013.01); *C02F 2103/026* (2013.01)

(56) References Cited

U.S. PATENT DOCUMENTS

| | | | | |
|---|---|---|---|---|
| 2003/0222010 A1* | 12/2003 | Bassett | ............... | B01D 27/06 210/312 |
| 2004/0104161 A1* | 6/2004 | Gaignet | ............ | B01D 35/303 210/323.2 |
| 2006/0000761 A1* | 1/2006 | Choi | ................... | B01D 61/10 210/232 |

FOREIGN PATENT DOCUMENTS

| | | |
|---|---|---|
| JP | H11-253936 | 9/1999 |
| JP | 2003-126846 | 5/2003 |
| JP | 2009-118916 | 6/2009 |
| JP | 2009-226326 | 10/2009 |
| JP | 2011-072900 | 4/2011 |

\* cited by examiner

FILTRATION DEVICE

CROSS-REFERENCE TO RELATED APPLICATIONS

This application is a 371 application of an international PCT application serial no. PCT/JP2013/054317, filed on Feb. 21, 2013, which claims the priority benefit of Japan application no. 2012-044394, filed on Feb. 29, 2012. The entirety of each of the abovementioned patent applications is hereby incorporated by reference herein and made a part of this specification.

TECHNICAL FIELD

The present invention relates to a filtration device for a water purification device, and particularly relates to a filtration device used in a water purification device of a medical instrument such as an endoscope.

BACKGROUND ART

Conventionally, the system described in Patent Document 1 has been known as a water purifier that filters the raw water supplied from a water pipe. The water purifier of Patent Document 1 is configured so as to flow raw water, entering to a cartridge from one end side of a cylindrical water purifier cartridge, to the other end direction along the inner wall of the water purifier cartridge, causing to pass through activated carbon arranged in the center in the radial direction on the other end side of the water purifier cartridge, and then causing to pass through a hollow-fiber membrane that is more towards the one end side of the water purifier cartridge than the activated carbon and supplying as purified water to the outside thereof.

On the other hand, a washing/disinfection device for medical devices is described in Patent Document 2 and, for example, a filtration device is used also in the case of circulating to use the cleaning solution of such a washing/disinfection device (particularly refer to paragraph [0025] and FIG. 3). In the filtration device for cleaning solution of such a medical application or the like, although it is not required to provide activated carbon or the like due to not requiring to remove chlorine, it is desired to treat large volumes of water in a short period.

CITATION LIST

Patent Literature

[Patent Document 1] Japanese Unexamined Patent Application, Publication No. 2009-226326
[Patent Document 2] Japanese Unexamined Patent Application, Publication No. 2009-118916

SUMMARY OF THE INVENTION

Technical Problem

As a filtration device used in a cleaning device of medical instruments such as an endoscope for which activated carbon and the like are not required, and high water treatment capacity is required, when using one made by simply removing a purification material from the water purifier described in Patent Document 1, although the treated amount of water increases per fixed time by removing the purification material, there has been a problem in that it has not been possible to achieve increased longevity of the hollow-fiber filter inside of the filtration device. In other words, with a kitchen water purifier like that described in Patent Document 1, since the treated amount of water being assumed is comparatively small, even if assuming that the water treatment capacity were improved by removing the purification material, there would still be a problem in that the longevity of the hollow-fiber filter that is an expendable item shortens.

Therefore, the present invention has been made in order to solve the aforementioned problems, and has an object of providing a filtration device that can achieve increased longevity of the hollow-fiber filter, while exhibiting high water treatment capacity in a water purification device that does not require a purification material, but for which high water treatment capacity is required.

Solution to Problem

In order to solve the aforementioned problems, the present invention is a filtration device having a housing case in which a water inlet unit and a water outlet unit are disposed at one end side, and a membrane module is provided inside of the housing case, in which inside of the housing case is provided with a first flow path for flowing a raw water having flowed in from the water inlet unit to another end side of the housing case, and a second flow path for allowing the raw water having flowed to the other end side of the housing case through the first flow path to pass through the membrane module and flow up to the water outlet unit, and in which a spacer is disposed on the second flow path on an upstream side of the membrane module.

According to the present invention configured in this way, it is possible to cause raw water to reliably flow in from an upstream side of the membrane module, by disposing the spacer on the second flow path on an upstream side of the membrane module, and forming a space on the upstream side of the membrane module. The membrane module can thereby be uniformly and evenly used, whereby increased longevity of the membrane module can be achieved. In addition, by configuring so as to flow raw water without passing a purification material such as activated carbon, it is possible to reduce the pressure loss compared to a case of there being a purification material on the upstream side of the membrane. In addition, by arranging a spacer on the second flow path on the upstream side of the membrane module to form a space therein, it is possible to accumulate suspended matter separating from the membrane module inside of this space. It is thereby possible to prevent the suspended matter having separated from the membrane module from not having any place to go and being captured by the membrane module again.

In addition, in the present invention, it is preferable for the first flow path to be provided between the membrane module and an inner wall of the housing case.

By forming the first flow path between the membrane module and the inner wall of the housing case in this way, it is possible to make the water having flowed in from the water inlet unit to flow into the membrane module from the other end side in the housing case of the membrane module. It is thereby possible to prevent water from flowing into the membrane module from a lateral part of the membrane module.

In addition, in the present invention, it is preferable for the spacer to be configured by a cylindrical body. The spacer has a spacer water inlet opening formed by opening towards a bottom face of the housing case, and a spacer water outlet opening formed by opening towards one end side of the housing case.

According to the present invention configured in this way, since the water having flowed through the second flow path to the membrane module on a bottom side of the housing case can be rectified by the spacer, it is possible cause the raw water to evenly flow in from the end face of the membrane module. It is thereby possible to more uniformly use the membrane module.

In addition, in the present invention, it is preferable for the membrane module to include: a hollow-fiber membrane body configured by a plurality of hollow-fiber membranes bent into a U-shape, wherein both ends of each of the plurality of hollow-fiber membranes is fixed by a sealing unit of cylindrical shape or circular truncated-cone shape; and a hollow holder unit having a membrane module water inlet opening and a membrane module water outlet opening, in which the hollow-fiber membrane body is fixed inside of the holder unit so that the sealing unit faces the membrane module water outlet opening, and a diameter of the holder unit on a membrane module water inlet opening side thereof is longer than a diameter of the hollow-fiber membrane body on a water outlet opening side of the sealing unit.

According to the present invention configured in this way, since the diameter of the influx side end of the hollow-fiber membrane body can be made longer than the diameter of the discharge side end of the hollow-fiber membrane body, a gap can be formed between a plurality of hollow-fiber membranes constituting the hollow-fiber membrane body at the discharge side end. It is thereby possible to make the density of the hollow-fiber membranes at the influx side end to be coarse, whereby clogging of the hollow-fiber membranes can be suppressed. Furthermore, by making the density of the hollow-fiber membranes at the influx side end coarse, the suspended matter accumulated at the hollow-fiber membranes tends to fall off from the hollow-fiber membranes. In addition, by using a plurality of hollow-fiber membranes, it is possible to make the obtained filtration area greater, whereby the filtration rate can be raised, and the linear velocity during filtration can be decreases; therefore, the filtration longevity can be extended.

In addition, in the present invention, it is preferable for the plurality of hollow-fiber membranes to contain a hydrophilic hollow-fiber membrane and a hydrophobic hollow-fiber membrane.

According to the present invention configured in this way, by mixing a hydrophilic hollow-fiber membrane and a hydrophobic hollow-fiber membrane, it is possible to satisfactory extract air when the raw water passes through the membrane module. It is possible to filtrate using the hollow-fiber membrane body in a state without air pockets, whereby increased longevity of the membrane module can be achieved.

In addition, in the present invention, it is preferable for the housing case to be adapted to be connectable to an external device with a coupler system, when connecting the water inlet unit and the water outlet unit with piping of the external device.

According to the present invention configured in this way, since the housing case is adapted so as to be connectable with an external device with a coupler system, the housing case can be easily detached from the external device. The replacement operation of the membrane filter can thereby be facilitated.

In addition, in the present invention, it is preferable to include a water drainage mechanism formed in a bottom face of the housing case.

According to the present invention configured in this way, it is possible to drain water from the housing case easily when replacing the membrane module. Furthermore, by providing the water drainage mechanism in the bottom face of the housing case, suspended matter collected inside of the housing case can be removed simultaneously with water draining, when performing water drainage from the housing case.

Furthermore, by providing the water drainage mechanism in the bottom face of the housing case, it is possible to also remove suspended matter collected in the space inside of the housing case simultaneously with water draining, when performing water draining from the housing case.

Effects of the Invention

According to the present invention, in the above way, it is possible to achieve increased longevity of hollow-fiber membranes, while exhibiting high water purification capacity, in a water purification device that does not require a purification material, but for which high water treatment capacity is required.

DESCRIPTION OF EMBODIMENTS

Hereinafter, a filtration device according to an embodiment of the present invention will be explained by referencing the drawings.

Figure 1:
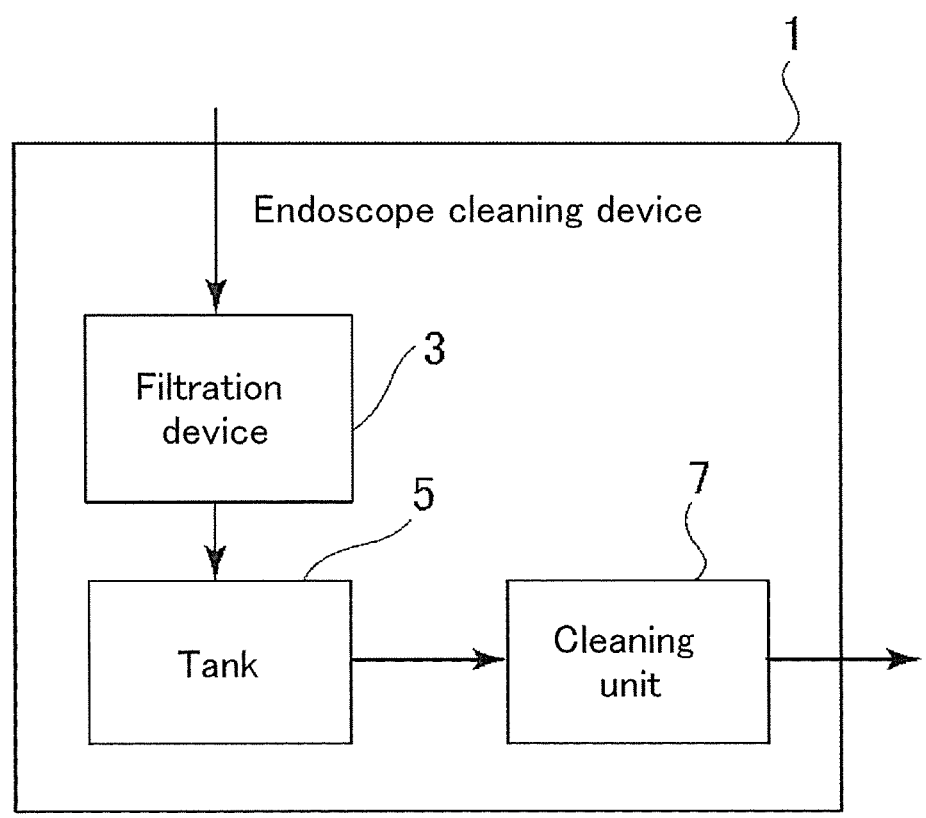
FIG. 1 is a block diagram showing the configuration of an endoscope cleaning device provided with a filtration device according to an embodiment of the present invention.

FIG. 1 is a block diagram showing the configuration of an endoscope cleaning device provided with the filtration device according to the embodiment of the present invention. The endoscope cleaning device 1 is made so as to clean the endoscope by filtrating the raw water from an external general water tap, and includes a filtration device 3 for filtrating raw water, a tank 5 for storing filtrated water filtrated by the filtration device 3, and a cleaning unit 7 for cleaning a used endoscope using the filtrated water stored in the tank 5. Then, the water used in the cleaning unit 7 is made so as to discharge to the outside through a predetermined drainage mechanism.

Figure 2:
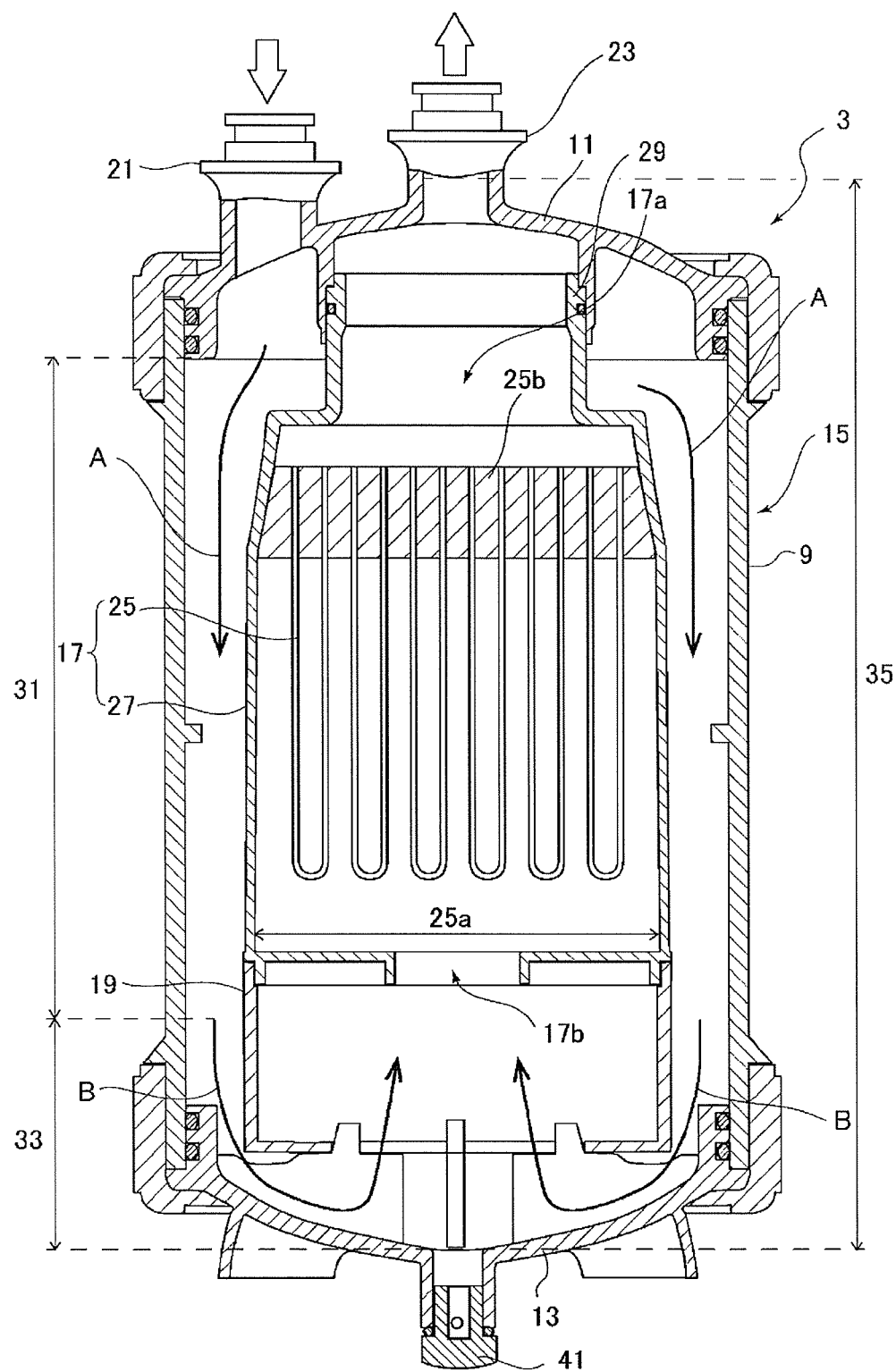
FIG. 2 is a cross-sectional view showing the filtration device according to the embodiment of the present invention.

FIG. 2 is a cross-sectional view showing the filtration device. As shown in FIG. 2, the filtration device 3 includes a housing case 15 that has a case 9 having a predetermined length, a header 11 installed at one end side of the case 9, and a bottom cover 13 installed at another end side of the case 9; a membrane module 17 arranged inside of this housing case 15; and a spacer 19 arranged between this membrane module 17 and the bottom cover 13 of the housing case 15. The case 9 of the housing case 15 has a substantially cylindrical shape, in which the head 11 is installed in an airtight manner to one open end, and the bottom cover 13 is installed in an airtight manner to be removable to the other open end. The header 11 includes a water inlet unit 21 for allowing raw water to flow into the housing case 15, and a water outlet unit 23 for supplying the filtrated water out of the housing case 15. This water inlet unit 21 and water outlet unit 23 are made so as to be connectable by a coupling system to a predetermined connector (not illustrated) at a side of the endoscope cleaning device 1.

The membrane module 17 is arranged inside of the housing case 15, and is made so as to filtrate the raw water flowing in from the water inlet unit 21 of the header 11. This membrane module 17 includes a hollow-fiber membrane body 25 formed from a plurality of hollow-fiber membranes bent into a U-shape, and a holder unit 27 for retaining this hollow-fiber membrane body 25. The upper part of the holder unit 27 of the membrane module 17 is joined to a water outlet pipe 29 for flowing the water filtrated by the hollow-fiber membrane body 25 towards the water outlet unit 23 of the header 11. Then, this water outlet pipe 29 is formed so as to be detachable relative to the header 11.

The holder unit 27 of the membrane module 17 has a substantially cylindrical shape as a whole, and includes a membrane module water outlet opening 17a connected to the water outlet pipe 29, and a membrane module water inlet opening 17b connected to the spacer 19. This holder unit 27 defines the flow path when water passes through the membrane module 17, and is configured so that the raw water to be filtrated is received from the membrane module water inlet opening 17b, and the filtrated water thus filtrated which drains from the membrane module water outlet opening 17a. Then, the radius of the membrane module water outlet opening 17a is longer than the radius of the membrane module water inlet opening 17b.

In addition, a gap is formed between the membrane module 17 and the inner wall of the housing case 15, and a first flow path 31 is formed for flowing the raw water which is flowed into the water inlet unit of the header to the other end side of the housing case 15 than the membrane module 17. In addition, at a further downstream side than the first flow path 31, a second flow path 33 is formed for allowing raw water having flowed through the first flow path 31 to pass through the membrane module 17 and flow up to the water outlet unit 23.

The hollow-fiber membrane body 25 is formed from a plurality of hollow-fiber membranes. A discharge side end of the hollow-fiber membrane body 25 is adhered and fixed to the holder unit 27 by using a sealing unit 25b constituted by a sealant (adhesive) with a urethane resin, epoxy resin or the like as a main component. At this time, a tip of the hollow-fiber membrane is opened, so that water having passed through the tip of the hollow-fiber membrane can be discharged. In FIG. 2, the hollow-fiber membrane body 25 is retained inside of such a holder unit 27 to be integral with the holder unit 27, and the holder unit 27 also has a shape that tapers off towards a side of the water outlet pipe 29, matching the shape of the circular truncated cone-shaped sealing unit 25b. It should be noted that the shape of the sealing unit 25b may be a substantially columnar shape, and the holder unit may also be a column which matches this shape. Such a hollow-fiber membrane body 25 can also be obtained by cutting an end face so that a leading end part is opened, after fixing the leading end of a membrane bundle made by simply bundling a plurality of hollow-fiber membranes bent into a U-shape. In addition, it is also possible to form by winding hollow-fiber membranes braided into a U-shape bent belt shape to form a columnar body, making one end of the columnar shape into a state bound by thread, and making the other end into a free state. In either case, each hollow-fiber membrane has a potting part that is partially cut out, and a leading end that is opened towards a clean water supply opening 23 (i.e., water outlet unit). Then, regarding the diameter at the discharge side of the sealing unit 25b and the diameter of an influx side end 25a of the holder unit, these two diameters become longer than the diameter of the membrane module water outlet opening 17a.

As a hydrophilic raw material constituting the hollow-fiber membrane body 25, there are cellulose fibers, polyvinyl alcohol fibers and the like, and as a hydrophobic raw material, it is possible to use raw materials consisting of various materials such as polyolefin fibers (polyethylene, polypropylene, 4-methyl-1-pentene, etc.), polyether fibers, polymethylmethacrylate (PMMA) fibers, polysulfone fibers, polyacrylonitrile fibers, fluororesin fibers (polytetrafluoroethylene, polyvinylidene fluoride, etc.), polycarbonate fibers, polyamide fibers, and aromatic polyamide fibers. Furthermore, a membrane produced by surface hydrophilization treating the raw material surface of a hollow-fiber membrane of a hydrophobic raw material (e.g., polyolefin fibers) with polyvinyl alcohol or the like can also be used as the hydrophilic raw material. In addition, when constituting the hollow-fiber membrane body 25, two or more types of hollow-fiber membranes may be mixed, and further, it is preferable for a membrane consisting of hydrophilic raw material and a membrane consisting of hydrophobic raw material to be mixed. It is thereby possible to quickly extract air inside of the membrane module.

Figure 3:
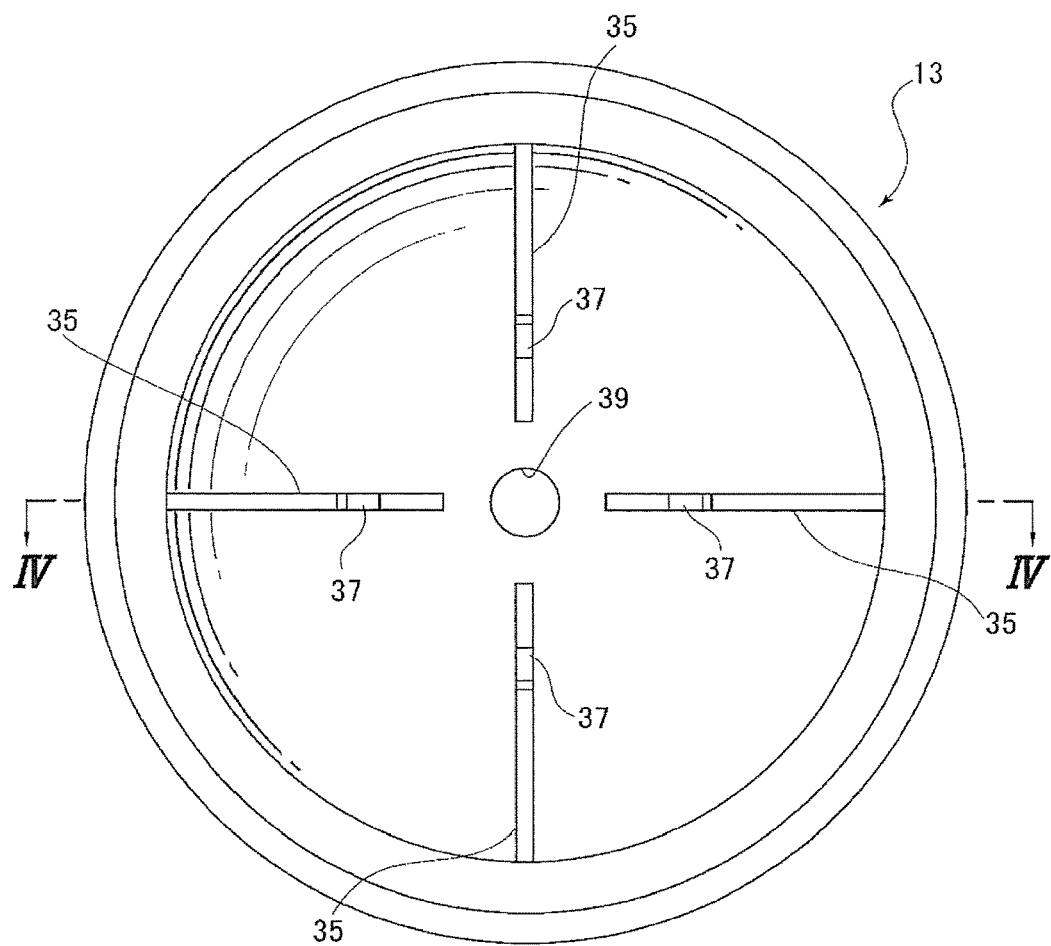
FIG. 3 is a top view showing a bottom cover of a housing case according to the embodiment of the present invention.
Figure 4:
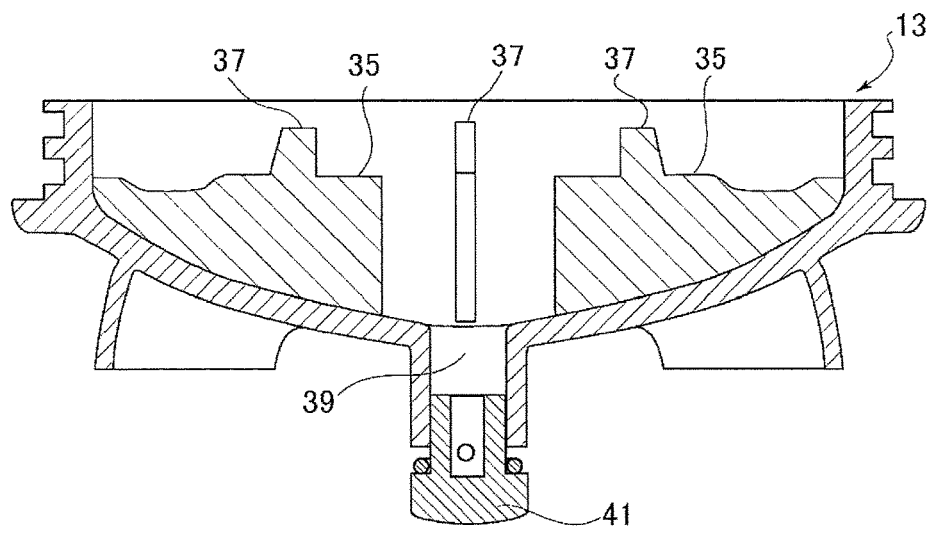
FIG. 4 is a cross-sectional view of a cross-section along IV-IV in FIG. 3.

FIG. 3 is a top view showing the bottom cover of the housing case, and FIG. 4 is a cross-sectional view of a cross section of the line IV-IV in FIG. 3. As shown in FIG. 3 and FIG. 4, the bottom cover 13 of the housing case 15 has a dome shape, and four supporting walls 35 are formed at an inner side thereof. The bottom cover 13 is configured to be detachable relative to the case 9. Each of the supporting walls 35 formed on the bottom cover 13 is provided to stand substantially perpendicular from the bottom face of the bottom cover 13, and extends radially from the vicinity of the center of the bottom face with a 90° interval from each other. Then, a space in which raw water flows is formed between the supporting walls 35. In addition, each of the supporting walls 35 is not connected in the center part of the bottom face, and thus a space is formed between the ends of each of the supporting walls 35 at the central side of the bottom face. This space communicates with the first flow path 31 formed between the housing case 15 and the membrane module 17, and is made so that raw water having flowed through the first flow path 31 flows into the space. In addition, a retaining hook 37 for retaining the spacer 19 is formed at the top of each supporting wall 35. This retaining hook 37 has a shape projecting upwards at the center of the supporting wall 35. Furthermore, at the center of the bottom cover 13, i.e. lowest part of the bottom face, a water drainage hole 39 is formed. The water drainage hole 39 is sealed by a cap 41 usually; however, by moving this cap 41 downwards, it is made so as to communicate with outside of the bottom cover 13.

Figure 5:
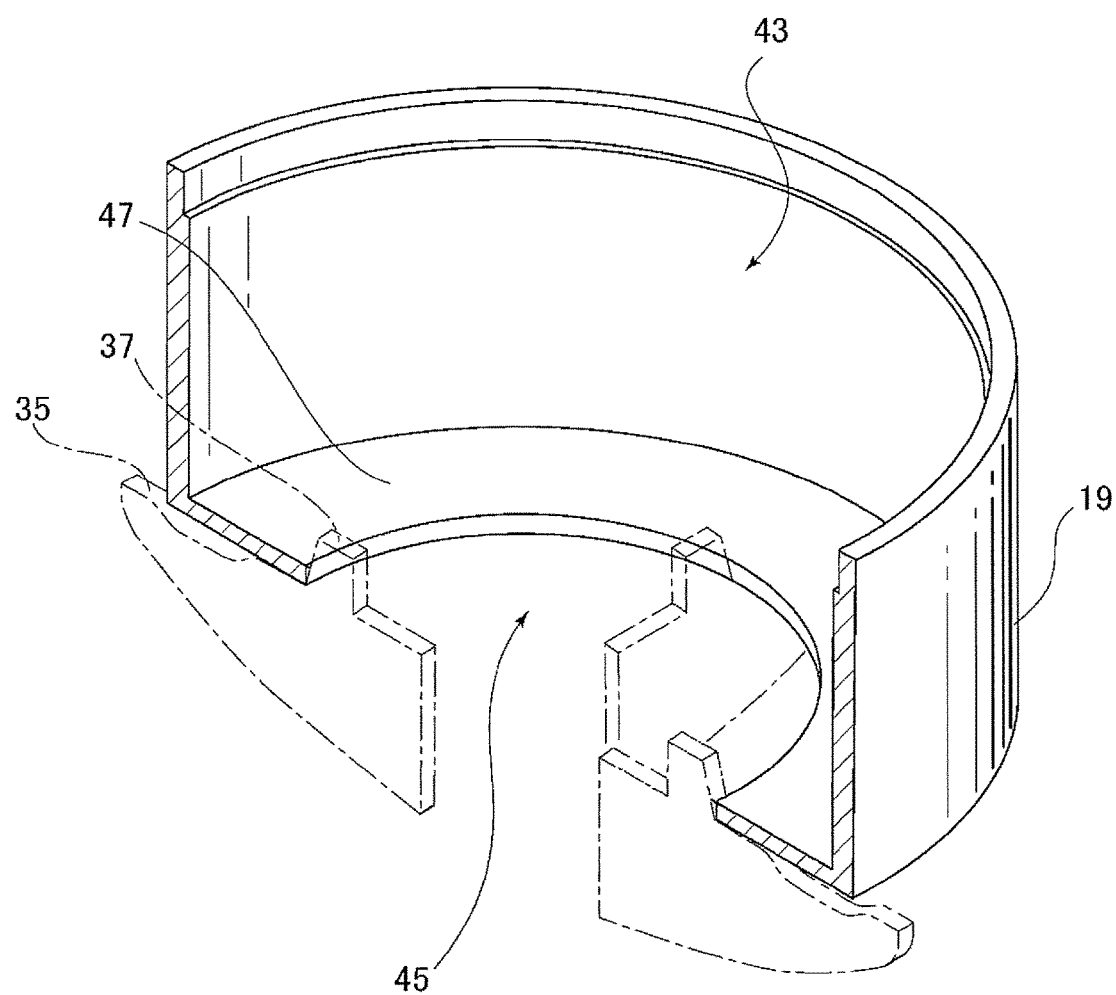
FIG. 5 is a cross-sectional perspective view of a spacer of the filtration device according to the embodiment of the present invention.

FIG. 5 is a cross-sectional perspective view of the spacer. The spacer 19 forms a substantially cylindrical shape having a predetermined length, and includes a spacer outlet opening 43 that is completely opened, and a bottom face 47 in which a spacer inlet opening 45 is formed at the center. The spacer outlet opening 43 has substantially the same diameter as the holder unit 27 of the membrane module 17, and is made so as to be able to join the spacer 19 and the membrane module inlet opening 17b of the holder unit 27. In addition, the spacer inlet opening 45 has a diameter such that the retaining hooks 37 of the four supporting walls 35 are caught, and is made so as to retain the spacer 19 by way of the bottom cover 13 when placing the spacer 19 on the bottom cover 13. Then, in a state where the spacer 19 is being supported on the supporting walls 35, the spacer inlet opening 45 of the spacer 19 and the spaces between supporting walls 35 are in communication. Then, the spacer 19 is made so as to rectify the raw water having entered from the spacer inlet opening 45 at the inside.

Next, operations of the endoscope cleaning device 1 having the filtration device 3 according to the present invention will be explained using FIG. 6 and FIG. 7. It should be noted that the cross-sectional view of the filtration device shown in FIG. 6 is the same as that shown in FIG. 2.

Figure 6:
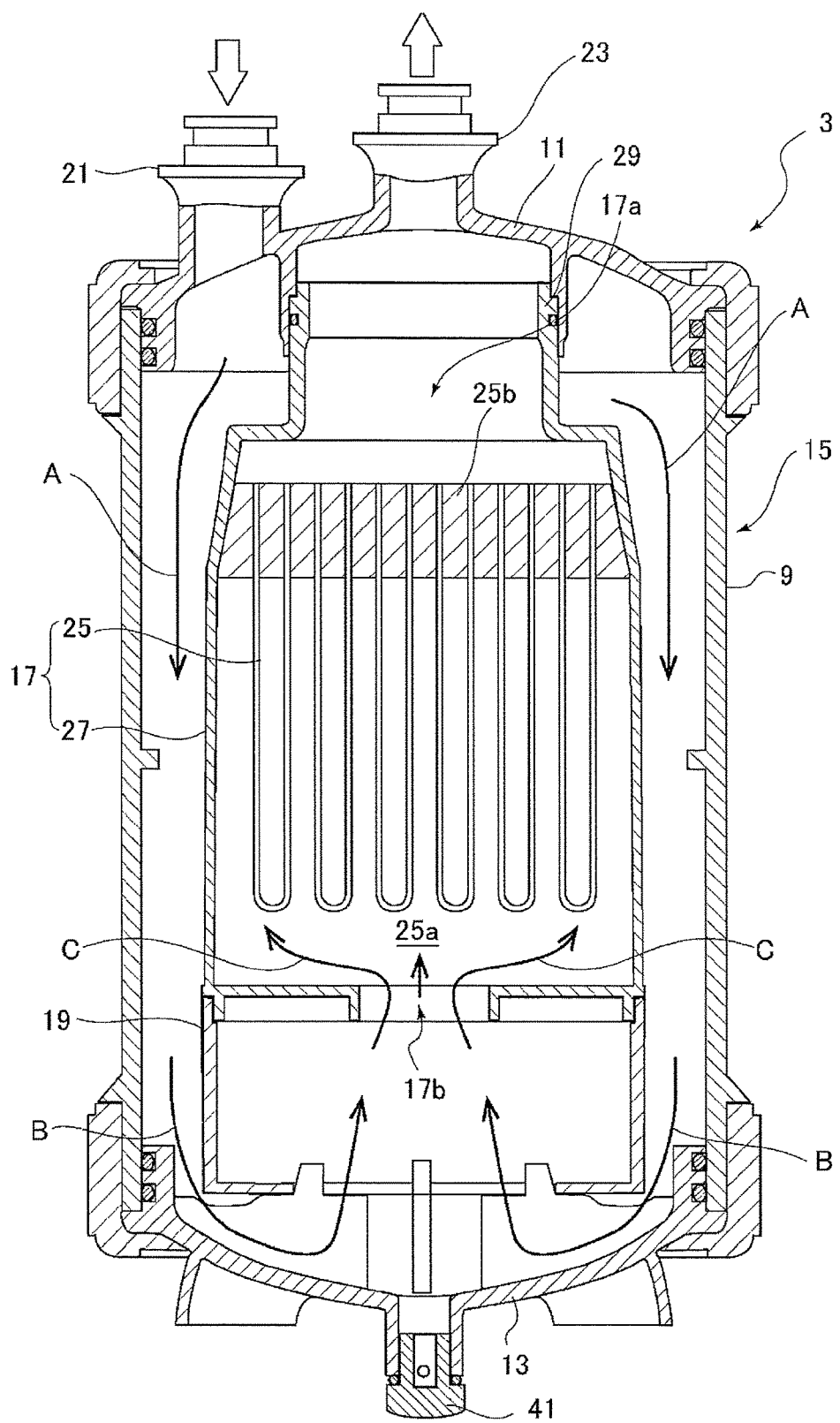
FIG. 6 is a cross-sectional view showing the filtration device according to the embodiment of the present invention, and illustrates the flow of raw water inside the filtration device.

As shown in FIG. 6, when raw water flows into the endoscope cleaning device 1 from an external water source such as a common water tap, the raw water is sent to the filtration device 3. When the raw water reaches the filtration device 3, the raw water is sent inside of the housing case 15 from the water inlet unit 21 of the header 11. The raw water having entered inside of the housing case 15 flows from the header 11, through the first flow path 31 between the housing case 15 and the membrane module 17, towards the direction of the bottom cover 13 (refer to arrows A in FIG. 6). Then, the raw water having flowed in the arrow A direction and reached the other end side of the housing case 15 than the membrane module 17 enters the second flow path 33 from the first flow path 31, and passes through between the spacer 19 and the housing case 15 to flow into the space between the bottom cover 13 and the spacer 19. Then, the raw water flows from this space through the spacer inlet opening 45 of the spacer 19 arranged on the second flow path 33 into the spacer 19 (refer to arrows B in FIG. 6). The spacer 19 has a predetermined axial length; therefore, the raw water flowing into the spacer 19 from the spacer inlet opening 45 is rectified along the axial direction of the spacer 19 inside of the spacer 19. Then, the raw water flows into the membrane module 17 from the spacer outlet opening 43 of the spacer 19. Since the raw water is rectified inside of the spacer 19 at this time, the raw water flows into the membrane module 17, so as to uniformly apply pressure at the water inlet side end 25a of the hollow-fiber membrane body 25 of the membrane module 17 (refer to arrows C in FIG. 6). Then, the filtered water discharged from the water outlet side end 25b of the hollow-fiber membrane body 25 flows from the water outlet pipe 29 of the membrane module 17, through the water outlet unit 23 of the header 11 and into the tank 5 that is on a downstream side of the filtration device 3, and is stored inside of the tank 5. Then, the water stored in the tank 5 is used during use of the cleaning device 7.

Figure 7:
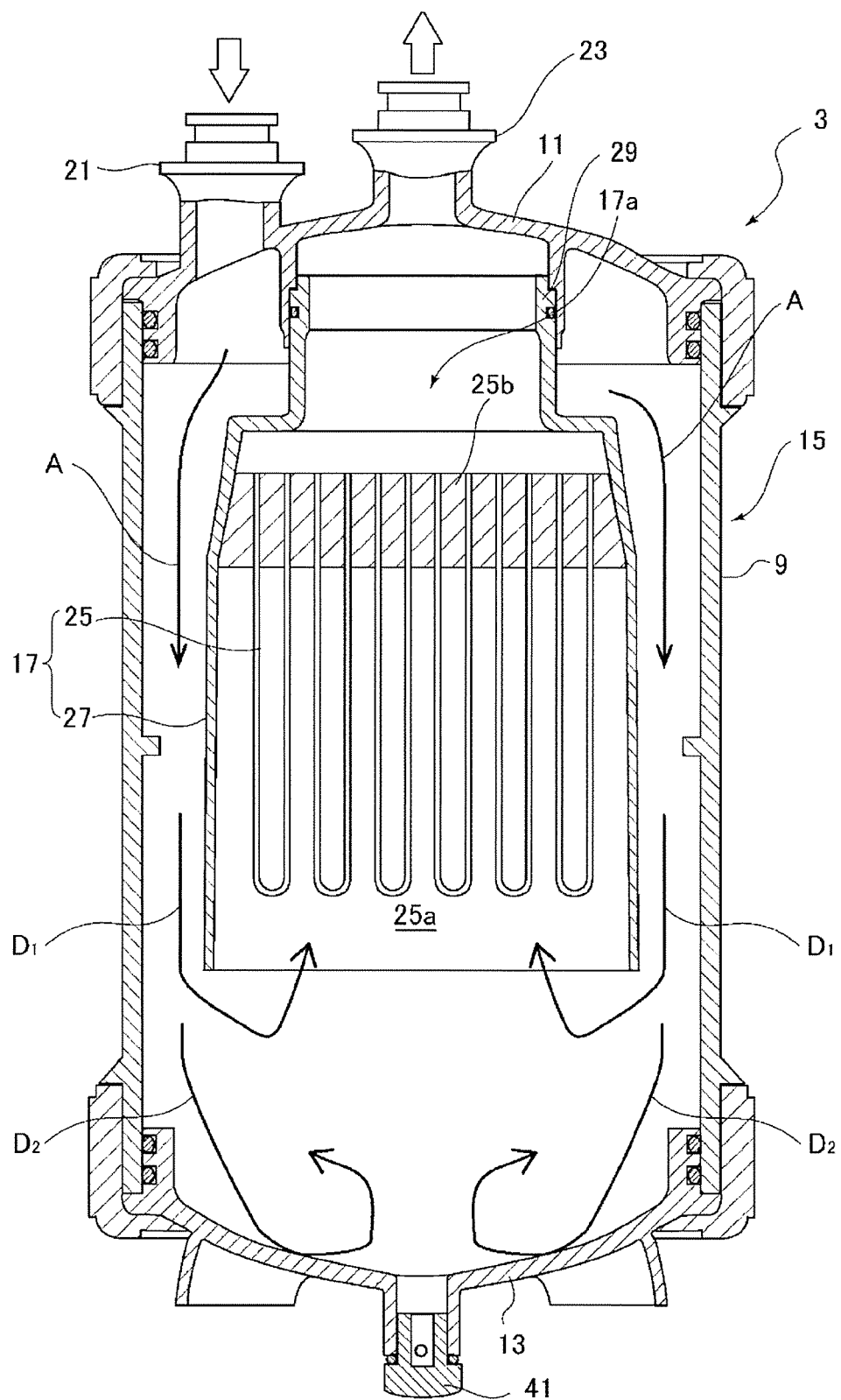
FIG. 7 is a cross-sectional view of a filtration device without a spacer according to a comparative example, and illustrates the flow of raw water inside of the filtration device.

As a comparative example for the filtration device 3 according to the embodiment of the present invention, a filtration device excluding the spacer 19 from the filtration device shown in FIG. 6 is shown in FIG. 7. It should be noted that, for convenience of explanation, the same reference numbers as FIG. 6 are assigned to the filtration device of FIG. 7.

As shown in FIG. 7, the raw water having flowed from the external water source such as a common water tap in the arrow A direction and reached the other end side of the housing case 15 than the membrane module 17 becomes turbulent, due to bouncing off at the bottom cover 13 or the like (refer to arrows $D_2$ in FIG. 7). In addition, when the raw water flows into the membrane module 17, since the inlet pressure to the water inlet side end 25a of the hollow-fiber membrane body 25 of the membrane module 17 is non-uniform, swirling turbulence occurs at the water inlet side end 25a (refer to arrows $D_1$ in FIG. 7).

With the conventional filtration device not installing a spacer in this way, due to becoming turbulent in the vicinity of the bottom cover 13 and in the vicinity of the water inlet side end 25a of the hollow-fiber membrane body 25, a proportionate time period is required in order to filtrate a large volume of water.

According to the filtration device 3 related to the embodiment of the present invention as stated above, it is possible to eliminate pressure loss when passing a purification material or the like, since it is possible to make raw water having passed through the first flow path 31 between the housing case 15 and membrane module 17 flow into the membrane module 17 directly without passing a purification material or the like. It is thereby possible to filtrate a large volume of water in a short time. In addition, prior to raw water entering the membrane module 17, since it is made so as to pass through the inside of the spacer 19, the flow of raw water can be rectified in the extending direction of spacer 19, i.e. extending direction of the membrane module 17. It is thereby possible to make the raw water evenly flow into the membrane module 17, and the hollow-fiber membranes constituting the hollow-fiber membrane body 25 can be used uniformly.

In addition, when using the membrane module 17, there are cases where suspended matter collecting in the hollow-fiber membrane body 25 separate from the hollow-fiber membrane body 25; however, according to the filtration device 3 according to the present embodiment, since it is possible to collect suspended matter having separated from the hollow-fiber membrane body 25 in the space inside the spacer 19, it is possible to prevent suspended matter from returning into the membrane module 17 again and causing the filtration performance of the membrane module 17 to decline.

Furthermore, by providing the water drainage hole 39 at the lowest part of the bottom cover 13 of the housing case 15, it is possible to drain water remaining inside of the housing case 15 prior to replacing the membrane module 17. With the filtration device 3 used in special equipment like an endoscope cleaning device, it is necessary to drain the water inside of the housing case 15 when replacing the membrane module 17; however, by providing such a water drainage hole 39, it is possible to facilitate replacement of the membrane module 17.

The invention claimed is:

1. A filtration device having a housing case in which a water inlet unit and a water outlet unit are disposed at a first end side, and a membrane module that is provided inside of the housing case, wherein the membrane module comprises:
a hollow-fiber membrane body, configured by a plurality of hollow-fiber membranes bent into a U-shape, wherein both ends of each of the plurality of hollow-fiber membranes is fixed by a sealing unit of cylindrical shape or circular truncated-cone shape; and a hollow holder unit, having a membrane module water inlet opening and a membrane module water outlet opening, wherein the hollow-fiber membrane body is fixed inside of the holder unit so that the sealing unit faces the membrane module water outlet opening, and a diameter of the holder unit on a membrane module water inlet opening side thereof is longer than a diameter of the hollow-fiber membrane body on a water outlet opening side of the sealing unit, wherein inside of the housing case is provided with a first flow path for flowing a raw water having flowed in from the water inlet unit to a second end side of the housing case, and a second flow path for allowing the raw water having flowed to the second end side of the housing case through the first flow path to pass through the membrane module and flow up to the water outlet unit, and wherein a spacer is disposed on the second flow path on an upstream side of the membrane module;

wherein the spacer comprises:
   a spacer water inlet opening, formed by opening towards a bottom face of the housing case; and
   a spacer water outlet opening, formed by opening towards the first end side of the housing case,
wherein the spacer is configured by a cylindrical body,
wherein a plurality of supporting walls are formed on the second end side of the housing case, each of the supporting walls extends radially from a periphery of the second end side of the housing case toward a center of the second end side of the housing case, a retaining hook is formed on each of the supporting walls, the spacer water inlet opening has a diameter such that the retaining hooks may be able to catch and retain the spacer, and the spacer is being supported on the supporting walls, wherein the second flow path allows the raw water to enter the spacer water inlet opening by passing through a gap between a bottom face of the spacer and the second end side of the housing case.

2. The filtration device according to claim 1, wherein
the first flow path is provided between the membrane module and an inner wall of the housing case.

3. The filtration device according to claim 1, wherein the plurality of hollow-fiber membranes contains a hydrophilic hollow-fiber membrane and a hydrophobic hollow-fiber membrane.

4. The filtration device according to claim 1, wherein the housing case is adapted to be connectable to an external device with a coupler system, when connecting the water inlet unit and the water outlet unit with piping of the external device.

5. The filtration device according to claim 1, wherein
the filtration device comprises a water drainage mechanism, formed in the second end side of the housing case.

* * * * *